United States Patent
Shah

(10) Patent No.: US 8,983,714 B2
(45) Date of Patent: Mar. 17, 2015

(54) FAILSAFE COMMUNICATION SYSTEM AND METHOD

(71) Applicant: Robert Bosch GmbH, Stuttgart (DE)

(72) Inventor: Ankit Shah, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 13/774,904

(22) Filed: Feb. 22, 2013

(65) Prior Publication Data

US 2014/0142801 A1    May 22, 2014

Related U.S. Application Data

(60) Provisional application No. 61/727,158, filed on Nov. 16, 2012.

(51) Int. Cl.
*G01M 17/00* (2006.01)
*G06F 17/00* (2006.01)
*H04L 12/26* (2006.01)
*G07C 5/00* (2006.01)
*H04L 12/40* (2006.01)
*G07C 5/08* (2006.01)

(52) U.S. Cl.
CPC .............. *G06F 17/00* (2013.01); *H04L 43/065* (2013.01); *G01M 17/00* (2013.01); *H04L 2012/40215* (2013.01); *G07C 5/00* (2013.01); *H04L 2012/40273* (2013.01); *G07C 5/008* (2013.01); *G07C 5/085* (2013.01)
USPC .......................... 701/32.7; 701/33.5; 701/34.3

(58) Field of Classification Search
CPC .............................. G07C 5/008; G07C 5/0808
USPC ...................... 701/33.1–33.9, 34.1–34.4, 32.7
See application file for complete search history.

(56) References Cited

U.S. PATENT DOCUMENTS

| 7,474,015 | B2 | 1/2009 | Enders et al. |
| 7,778,750 | B2 | 8/2010 | Knight et al. |
| 8,194,660 | B2 | 6/2012 | Birze et al. |
| 2008/0183484 | A1 | 7/2008 | Kondo et al. |
| 2008/0255721 | A1* | 10/2008 | Yamada ........................... 701/33 |
| 2009/0299566 | A1* | 12/2009 | Tanigawa et al. ............... 701/33 |

(Continued)

FOREIGN PATENT DOCUMENTS

EP    2112495    10/2009

OTHER PUBLICATIONS

"Impact Assessment of Two- or Three-Wheel Vehicles and Quadricycles," SEC European Commission, Apr. 14, 2011, 85 pages.

(Continued)

*Primary Examiner* — Russell Frejd
*Assistant Examiner* — Luke Huynh
(74) *Attorney, Agent, or Firm* — Michael Best & Friedrich LLP

(57) ABSTRACT

Methods and systems for analyzing failsafe conditions. One method includes receiving, at a processor, a message transmitted over a vehicle bus, wherein the message includes a data field. The method further includes accessing at least one data attribute included in a database file associated with the vehicle bus. The at least one data attribute includes at least one of (a) a safety critical attribute, (b) an automotive safety integrity level attribute, (c) a maturation time attribute, (d) a warning indicator attribute, and (e) a diagnostic trouble code attribute. The method also includes converting the data field based on the at least one data attribute.

20 Claims, 3 Drawing Sheets

(56) References Cited

U.S. PATENT DOCUMENTS

2010/0131816 A1  5/2010  Yamamoto et al.
2011/0166743 A1  7/2011  Sato
2011/0224866 A1  9/2011  Chen
2011/0304448 A1  12/2011  Kawamura
2012/0005393 A1  1/2012  Hu et al.

OTHER PUBLICATIONS

Lee, K., "IEEE-1451-Based Smart Module for In-Vehicle Networking Systems of Intelligent Vehicles," IEEE Transactions on Industrial Electronics, Dec. 2004, vol. 51, No. 6, pp. 1150-1158.
International Search Report and Written Opinion for Application No. PCT/US2013/070340 dated Feb. 25, 2014 (11 pages).

* cited by examiner

FAILSAFE COMMUNICATION SYSTEM AND METHOD

RELATED APPLICATIONS

The present application claims priority to U.S. Provisional Application No. 61/727,158 filed Nov. 16, 2012, the entire contents of which is hereby incorporated by reference.

BACKGROUND

The present invention relates to systems and methods for communication failsafe information over an in-vehicle network.

Original equipment manufacturers ("OEMs") develop and implement in-vehicle networks, including networks based on the controller area network ("CAN") platform. Although OEMs often provide failsafe guidelines for devices connected to the network, suppliers of the individual devices connected to the network typically define their own algorithms and logic to perform failsafe operations. Because each supplier can document their failsafe practices differently, the OEM typically must request such information from each supplier, which is often buried in one or more documents.

SUMMARY

Accordingly, in one embodiment, the invention provides a method and system for enhancing CAN messages at the message level, signal level, or both with failsafe details. These details can be defined in the database file for the CAN, which allows suppliers to perform failsafe operations and provide particular failsafe details over the CAN network in a format that can be easily captured and analyzed, such as by the OEM. Therefore, the OEM can capture failsafe details across multiple model years and multiple suppliers. The fields defined in the database file can also be used during network development and manufacturing. The failsafe fields can also aid a supplier, who can use the fields as part of automatic code generation and failure mode and effects analysis (e.g., "SFMEA") or similar reviews.

In particular, one embodiment of the invention provides a method for analyzing failsafe conditions. One method includes receiving, at a processor, a message transmitted over a vehicle bus. The message includes a data field. The method further includes accessing at least one data attribute included in a database file associated with the vehicle bus. The at least one data attribute includes at least one of (a) a safety critical attribute, (b) an automotive safety integrity level attribute, (c) a maturation time attribute, (d) a warning indicator attribute, and (e) a diagnostic trouble code attribute. The method also includes converting the data field based on the at least one data attribute.

Another embodiment of the invention provides a system for analyzing failsafe conditions. The system includes a processor. The processor is configured to receive a message transmitted over a vehicle bus. The message includes a data field. The processor is also configured to access at least one data attribute included in a database file associated with the vehicle bus. The at least one data attribute includes at least one of (a) a safety critical attribute, (b) an automotive safety integrity level attribute, (c) a maturation time attribute, (d) a warning indicator attribute, and (e) a diagnostic trouble code attribute. The processor is configured to convert the data field based on the at least one data attribute and output the converted data field for display to a user.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
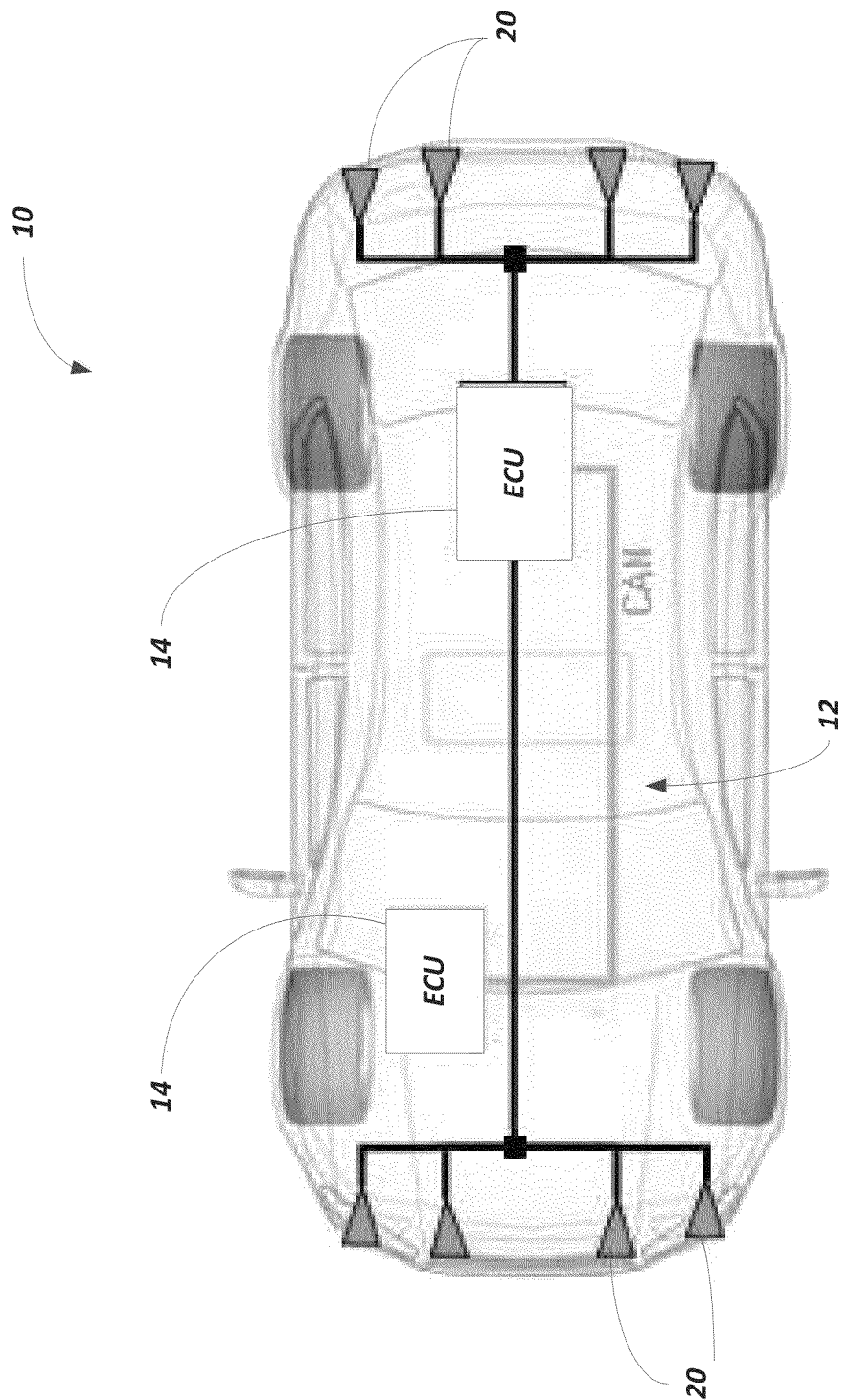
FIG. 1 schematically illustrates a vehicle including a controller area network system.

FIG. 1 illustrates a vehicle 10. The vehicle 10 includes a controller area network ("CAN") system or bus 12 and a plurality of electronic control units ("ECUs") 14. The ECUs 14 can include an engine controller, a brake controller, an electronic stability control system, etc. In some embodiments, sensors 20 (e.g., radar sensors, ultrasonic sensors, position sensors, temperature sensors, wheel speed sensors, acceleration sensors, etc.) are also connected the CAN bus 12 and use the CAN 12 bus to transmit data to the ECUs 14. The ECUs 14 also communicate with each other over the CAN system 12.

The first CAN system was developed by Robert Bosch GmbH in the 1980's as a communication system between three ECUs. As compared to other communication networks, such as a universal asynchronous receiver/transmitter network that uses point-to-point communication, the CAN system can have multiple masters. The CAN system also offers high immunity to electrical interference and the ability to detect errors. By 1993, the CAN system became the ISO 11898 standard.

Using a CAN system provides numerous benefits. First, a CAN system provides cost savings over point-to-point communication systems. In particular, CAN systems reduce the number of wires included in a vehicle. In particular, a two-wire CAN bus can place many signal wires without large software overhead. Therefore, CAN systems provide an inexpensive, durable network that allows multiple CAN devices to communicate. Therefore, ECUs can have a single CAN interface rather than analog and digital inputs to every other device in the system. Accordingly, CAN systems decrease vehicle cost and weight.

Devices on a CAN system send data across the CAN bus in packets called frames or messages. A CAN frame consists of a start-of-frame ("SOF") bit, an arbitration identifier ("ID"), an identifier extension ("IDE") bit, a remote transmission request ("RTR") bit, a data length code ("DLC"), a data field, a cyclic redundancy check ("CRC") field, and an acknowledge ("ACK") slot. The SOF bit indicates the beginning of a message with a dominant (logic 0) bit. The arbitration ID identifies the message and indicates the message's priority. Frames come in two formats. A standard format uses an 11-bit arbitration ID and an extended format uses a 29-bit arbitration ID. The IDE bit allows differentiation between standard and extended frames. The RTR bit serves to differentiate a remote frame from a data frame. A dominant (logic 0) RTR bit indicates a data frame. A recessive (logic 1) RTR bit indicates a remote frame. The DLC indicates the number of bytes contained in the data field. The data field contains 0 to 8 bytes of data. The CRC contains a 15-bit cyclic redundancy check code and a recessive delimiter bit. The CRC field is used for error detection. The ACK slot is used to indicate correct reception of a message. In particular, any CAN controller that correctly receives the message sends an ACK bit at the end of the message. The transmitting node checks for the presence of the ACK bit on the bus and reattempts transmission if the transmitting node does not detect an acknowledgment.

A CAN signal is considered a piece of data contained within the data field of a CAN message. In some embodiments, the CAN signals are also referred to channels. Because the data field part of a CAN message can include up to 8 bytes of data, a single CAN frame can contain 0 to 64 individual signals (e.g., for 64 channels, each channel would be a binary channel). For example, if a particular CAN frame contains six channels in the data field, each signal can contains 8 bits of data (or one byte of data).

Figure 2:
FIG. 2 is a screen shot showing an example database file for a controller area network system.

CAN database files are text files that contain scaling information for CAN frames and signal definitions. These files have an .xml, .dbc, or .ncd extension format. For each signal in the data field, the CAN database define rules for conversion to engineering units. In particular, the following data attributes are stored in database files: (1) channel name, (2) location (start bit) and size (number of bits) of the channel within a given message, (3) byte order (Intel/Motorola), (4) data type (signed, unsigned, and IEEE float), (5) scaling and units string, (6) range, (7) default value, and (8) comment. Therefore, the database file can be used to convert "raw" frame information (usually bytes) to a "real world" value. For example, FIG. 2 is a screen shot of an example .dbc database file (known as a Vector database file) illustrating database message signal attributes.

By using a database file for many frames transmitted over a CAN network, an application programming interface ("API") (e.g., NI-XNET) (i.e., a software application executed by a processor) can be configured to automatically convert the frame information directly to a real-world value. Therefore, the API can simplify application development because users do not need to worry about raw frame values.

CAN database files may contain frame and signal definitions for an entire vehicle. Every network has its own unique database file. Additionally, these database files are vendor-specific and usually confidential. As noted above, original equipment manufacturers ("OEMs") develop and provide the CAN database to all of the suppliers of CAN devices to be installed on the CAN to allow for communication between the CAN devices (e.g., the microcontrollers included in each device). The different CAN devices communicate with each other and each CAN device gathers information from the other devices over the CAN bus to perform the device's defined functionality and failsafe operation. In some embodiments, the OEMs define failsafe guidelines for the devices connected to the CAN systems. However, the suppliers of the individual CAN devices often provide their own algorithms and logic to perform failsafe operations. Accordingly, every supplier commonly has their own way to document failsafe practices, and OEM engineering and manufacturing needs to rely on the supplier for any needed failsafe details, which may be buried in various documents provided by a particular supplier and defined in different documents from different suppliers. Therefore, even though the OEMs want different suppliers to follow the same practices over multiple models, this goal is not easy to achieve over a number of years.

Accordingly, the database file for a particular CAN system can be enhanced at a CAN message and/or signal level by providing new options for failsafe details. In particular, the database file can be extended to include the following data attributes:

(1) Safety Critical: Yes or No
(2) Automotive Safety Integrity Level:
(3) Maturation Time: n loops
(4) Warning Indicator: Yes or No
(5) Diagnostic Trouble Code: Uxxxx-xx The Safety Critical attribute is related to whether a particular CAN message or signal is associated with a comfort feature (e.g., a brake disc wiping feature), a safety feature (e.g., an electronic stability control system or a fraction control system), or a base feature (e.g., electronic brakeforce distribution). The ASIL Level attribute is used to define an ASIL rating that a particular CAN message or signal falls into (e.g., a rating of "A," "B," "C," or "D").

The Maturation Time attribute provides the recommended maturation time for message or signal timeout, data length, or implausible or invalid behavior. Similarly, the Diagnostic Trouble Code attribute provides the recommended diagnostic trouble for message or signal time, data length, or implausible or invalid behavior. The Warning Indicator attribute specifies whether a particular CAN message or signal indicates activation of any human-machine interface or electronic vehicle information center.

Accordingly, with the additional fields defined above, suppliers and OEMs can capture messages corresponding to failsafe practices across multiple model years and multiple suppliers. In particular, OEMs can use the additional fields defined by the CAN database file to efficiently and comprehensively manage, track, and identify failsafe practices by different suppliers of CAN devices. Similarly, suppliers can use the additional fields as part of automatic code generation and during review, such as SFMEA reviews.

Figure 3:
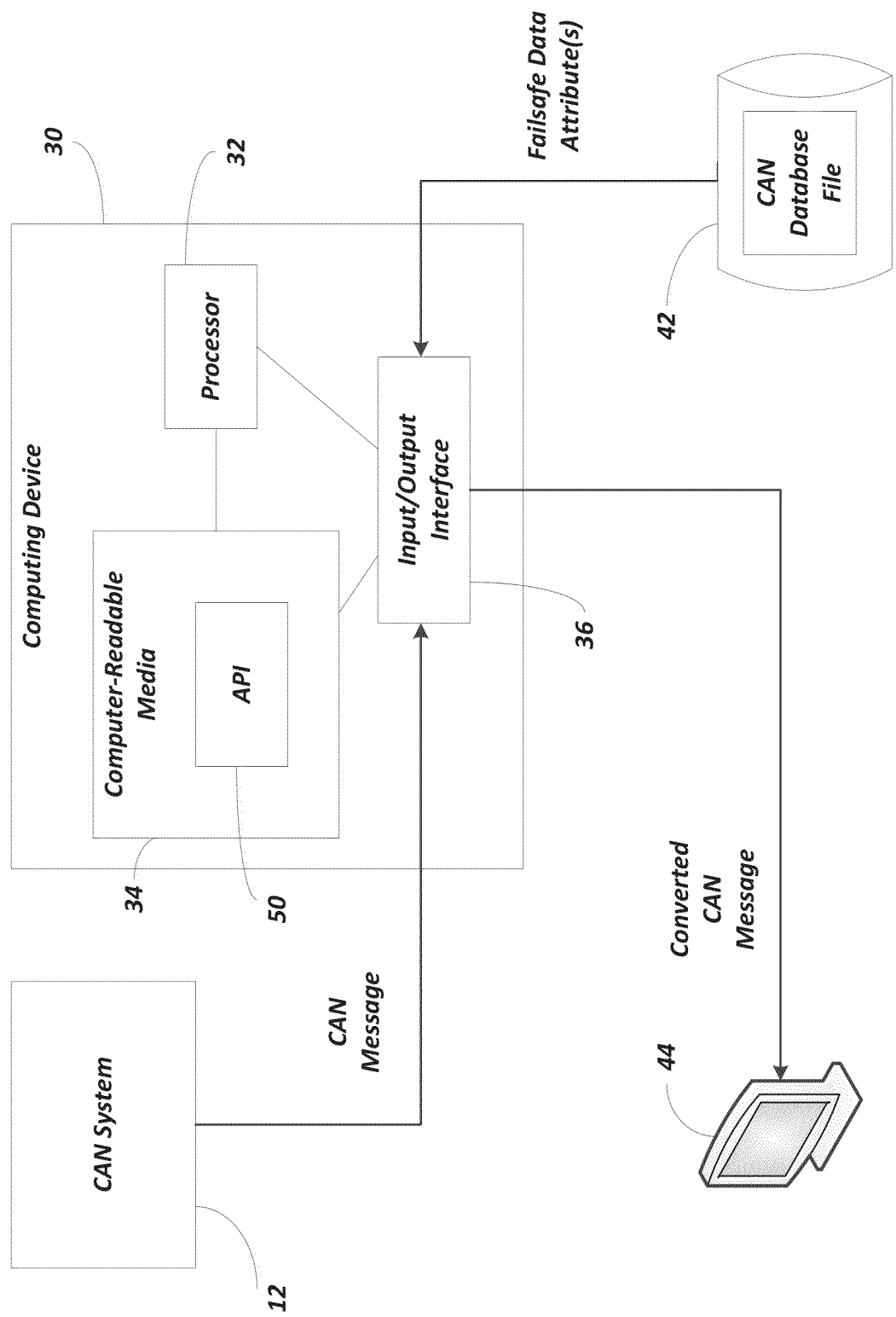
FIG. 3 schematically illustrates a system for converting messages received over a controller area network system.

For example, as illustrated in FIG. 3, a computing device 30 can include a processor 32, non-transitory computer-readable media 34, and an input/output interface 36. The computer-readable media 34 can include random access memory ("RAM") and/or read-only memory ("ROM"). The input/output interface 36 receives information from the CAN system 12 (e.g., over a wired connection). The input/output interface 36 can also transmit and receive information from external computer-readable media, such as a database file for the CAN system 12 stored in one or more external computing devices, such as a server 42. The input/output interface 36 can access the server 42 via a wired connection, a wireless connection, or a combination thereof. In some embodiments, the database file, or a portion thereof, is stored in the computer-readable media 34. As illustrated in FIG. 3, the input/output interface 36 can also transmit data to a monitor 44 over a wired connection, a wireless connection, or a combination thereof.

The processor 32 receives information (e.g., from the media 34 and/or the input/output interface 36) and processes the information by executing one or more instructions or modules. The instructions or modules are stored in the computer-readable media 34. In particular, as illustrated in FIG. 3, an API 50 is stored in the media 34. As described above, the API 50 is configured to automatically convert raw information included in a CAN message to a real-world value. It should be understood that although only a single processor, input/output interface, and computer-readable media module are illustrated in FIG. 3, the computing device 30 can include multiple processing units, memory modules, and/or input/output interfaces.

As illustrated in FIG. 3, the API 50, as executed by the processor 32, receives a CAN message from the CAN system 12. The API 50 is configured to take the raw data included in the message and convert the raw data into human-appreciable data. In particular, the API 50 access the database file that includes failsafe data attribute enhancements as discussed above. The API 50 uses these attributes to convert the raw data, such as data relating to a failsafe condition. The API 50 then outputs the converted data to the monitor 44, where the converted data is displayed to a user. In other embodiments, the API 50 can store the converted data to the media 34 or external computer-readable media, where the data can be used by other applications for various data mining and analytic analysis. For example, as noted above, OEMs can use the failsafe data attribute enhancements to easily capture and analyze failsafe details across multiple model years and multiple suppliers. The fields defined in the database file can also be used during network development and manufacturing. The failsafe fields can also aid a supplier, who can use the fields as part of automatic code generation and failure mode and effects analysis (e.g., "SFMEA") or similar reviews.

Thus, the invention provides, among other things, improved CAN communication associated with failsafe practices by using the CAN database file. Various features and advantages of the invention are set forth in the following claims.

What is claimed is:

1. A method for analyzing failsafe conditions of a vehicle, the method comprising:
   receiving, at a processor, a message transmitted over a vehicle bus, the message including a data field;
   accessing at least one data attribute included in a database file associated with conversion of the message from the vehicle bus, the at least one data attribute including at least one of:
   (a) a safety critical attribute of a vehicle,
   (b) an automotive safety integrity level attribute of a vehicle,
   (c) a diagnostic trouble code attribute; and
   converting the data field based on the at least one data attribute;
   wherein, the data attribute defines communication of the failsafe conditions associated with a device electrically connected to the vehicle bus.

2. The method of claim 1, wherein the safety critical attribute is set to "Yes" and "No".

3. The method of claim 1, wherein the safety critical attribute indicates whether the data field is associated with a comfort feature, a safety feature, or a base feature.

4. The method of claim 1, wherein the automotive safety integrity level attribute indicates a rating selected from the group comprising "A," "B," "C," and "D".

5. The method of claim 1, including a maturation time attribute, wherein the maturation time attribute indicates a number of time loops.

6. The method of claim 1, wherein the maturation time attribute indicates a recommended maturation time for message or signal timeout.

7. The method of claim 1, including a maturation time attribute, wherein the maturation time attribute indicates a recommend maturation time for data length.

8. The method of claim 1, including a maturation time attribute, wherein the maturation time attribute indicates a recommend maturation time for invalid behavior.

9. The method of claim 1, wherein the diagnostic trouble code attribute indicates a recommended diagnostic trouble for message or signal time.

10. The method of claim 1, wherein the diagnostic trouble code attribute indicates a recommend diagnostic trouble for data length.

11. The method of claim 1, wherein the diagnostic trouble code attribute indicates a recommend diagnostic trouble for invalid behavior.

12. The method of claim 1, wherein the database file is a vehicle-specific controller area network database file with a file extension of at least one from the group consisting of .xml, .dbc., and .ncd.

13. The method of claim 1, including a warning indicator attribute, wherein the warning indicator attribute specifies whether the data field indicates activation of a human-machine interface.

14. The method of claim 1, wherein the data field includes a failsafe signal from an electronic control unit connected to the bus.

15. A vehicle system for analyzing failsafe conditions, the vehicle system comprising:
   a processor configured to
   receive a message transmitted over a vehicle bus, the message including a data field,
   access at least one data attribute included in a database file associated with conversion of the message from the vehicle bus, the at least one data attribute including at least one of:
   (a) an automotive safety integrity level attribute indicating a rating, and
   (b) a diagnostic trouble code attribute indicating a recommended diagnostic trouble,
   convert the data field based on the at least one data attribute; and
   output the converted data field for display to a user;
   wherein, the data attribute defines communication of the failsafe conditions associated with a device electrically connected to the vehicle bus.

16. A method for analyzing failsafe conditions for an in-vehicle network, the method comprising:
   receiving, at a processor, a message transmitted from an electronic control unit over a vehicle bus, the message including a data field;
   accessing data attributes from the message, the data attributes included in a database file associated with the vehicle bus including:
   (a) channel name,
   (b) location and size of a channel,
   (c) data type; and
   (d) a safety critical attribute.

17. The method of claim 16, the data attributes further comprising (e) an automotive safety integrity level attribute that includes a rating.

18. The method of claim 16, the data attributes further comprising (e) a warning indicator attribute, and (f) a maturation time attribute.

19. The method of claim 16, the data attributes further comprising:
   (e) a diagnostic trouble code attribute; and the method further comprising the step of converting the data field based on the data attributes.

20. The method of claim 16, the data attributes further comprising:
   (e) an automotive safety integrity level attribute having a rating,
   (f) a warning indicator attribute set as "Yes" or "No",
   (g) a maturation time attribute,
   (h) a diagnostic trouble code attribute, and
   the method further comprising the step of converting the data field based on the data attributes, and
   wherein the safety critical attribute indicates whether the data field is associated with a comfort feature, a safety feature, or a base feature.

* * * * *